May 16, 1933.   R. D. GREEN ET AL   1,908,838
ROPE ATTACHMENT AND METHOD OF MAKING THE SAME
Filed Feb. 24, 1930
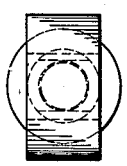
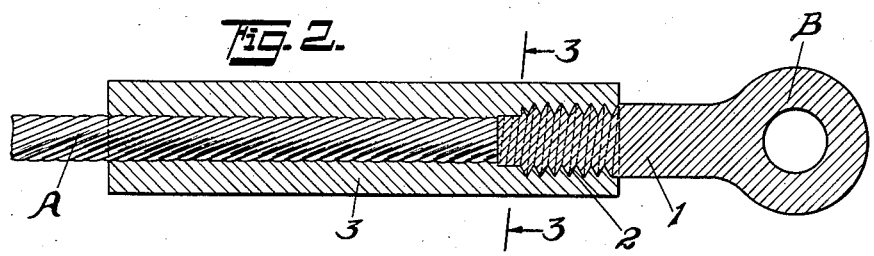
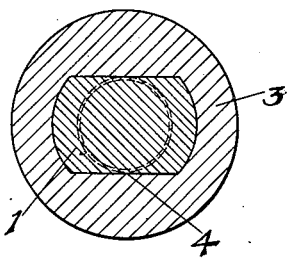

UNITED STATES PATENT OFFICE

RICHARD DUANE GREEN AND ARCHIBALD J. MORGAN, OF TRENTON, NEW JERSEY, ASSIGNORS TO JOHN A. ROEBLING'S SONS COMPANY, OF TRENTON, NEW JERSEY, A CORPORATION OF NEW JERSEY

ROPE ATTACHMENT AND METHOD OF MAKING THE SAME

Application filed February 24, 1930. Serial No. 430,922.

This invention relates to the anchoring of attachments of various kinds such as eyes, hooks, studs and other such elements to the end of a wire rope.

The object of the invention is to provide an improved and efficient anchorage for wire rope attachments, and a method of producing it which shall be inexpensive and operable with the metals in a cold state and yet secure a connection as strong as or even stronger than the rope itself.

In the accompanying drawing, a construction embodying the invention is shown by way of illustration and this construction will now be described in detail and the features forming the invention then pointed out in the claims.

In the drawing:

Figure 1 is an end elevation of an attachment shown as an eye;

Figure 2 is a longitudinal section on line 2—2 of Figure 1, and

Figure 3 is an enlarged section on line 3—3 of Figure 2.

Referring to the drawing, A indicates the end of a wire rope shown as comprising a number of wires layed about a central core though the invention is equally applicable to ropes comprising strands. The attachment to be secured to the wire rope A is shown as an eye B having, as usual, a shank or stem 1.

In accordance with the present invention, the stem 1 is provided with suitable shear lugs as by threading at 2. A suitable sleeve 3 is then compressed down, as by swaging, upon the abutted ends of the wire rope A and the stem 1 of the attachment B, so that the material of the sleeve 3 flows into and fills not only the grooves of the wire rope but also the shear lugs 2 of the stem 1, thus firmly and positively gripping the wire rope A and the stem 1 of attachment B throughout the length of the sleeve.

As an additional lock between the parts the inner end of the stem 1 is preferably squared or flattened out of the circular, as shown at 4 in Figures 3 to prevent any possibility of unthreading.

It will be understood that the term shear lugs herein is intended to cover one or more shear lugs, as in some cases only a single shear lug may be used.

What is claimed is:

1. The method of anchoring an attachment having a stem to a wire rope, which consists in forming shear lugs on the stem, forming the inner end of said stem of a shape other than circular in cross section, abutting the ends of the wire rope and stem, cold compressing a sleeve down upon the wire rope and stem, and continuing said cold compression until the material of the sleeve flows into and fills the rope grooves and the stem shear lugs.

2. A wire rope connection comprising an attachment having a stem in abutment with the end of the wire rope, shear lugs on the stem, and a sleeve enclosing the rope end and stem and compressed thereon to secure the sleeve by a portion of its metal filling the rope grooves and the shear lugs.

3. A wire rope connection comprising an attachment having a stem, shear lugs on the stem, the inner end of said stem being of a shape other than circular on cross section, and a sleeve enclosing the rope end and stem and compressed thereon to secure the sleeve by a portion of its metal filling the rope grooves and the shear lugs.

RICHARD DUANE GREEN.
ARCHIBALD J. MORGAN.